US009549279B2

(12) United States Patent
Iwasaki et al.

(10) Patent No.: US 9,549,279 B2
(45) Date of Patent: Jan. 17, 2017

(54) INFORMATION PROCESSING DEVICE, INFORMATION PROCESSING SYSTEM, AND INFORMATION PROCESSING METHOD

(71) Applicant: SONY CORPORATION, Tokyo (JP)

(72) Inventors: Jun Iwasaki, Tokyo (JP); Eiko Sugisaki, Kanagawa (JP)

(73) Assignee: Sony Corporation, Tokyo (JP)

(*) Notice: Subject to any disclaimer, the term of this patent is extended or adjusted under 35 U.S.C. 154(b) by 135 days.

(21) Appl. No.: 13/862,753

(22) Filed: Apr. 15, 2013

(65) Prior Publication Data
US 2013/0316689 A1 Nov. 28, 2013

(30) Foreign Application Priority Data
May 23, 2012 (JP) ................. 2012-117755

(51) Int. Cl.
H04W 4/00 (2009.01)
H04W 36/32 (2009.01)
H04L 29/08 (2006.01)
H04M 1/725 (2006.01)
H04M 1/57 (2006.01)

(52) U.S. Cl.
CPC ............ H04W 4/008 (2013.01); H04L 67/14 (2013.01); H04L 67/2842 (2013.01); H04M 1/576 (2013.01); H04M 1/72555 (2013.01); H04W 36/32 (2013.01)

(58) Field of Classification Search
CPC ......................... H04W 8/245; H04M 1/72525
USPC ......................................................... 455/418
See application file for complete search history.

(56) References Cited

U.S. PATENT DOCUMENTS

| 7,809,388 | B1* | 10/2010 | Othmer .......................... 455/518 |
|---|---|---|---|
| 2004/0186733 | A1* | 9/2004 | Loomis et al. ............... 704/278 |
| 2007/0277219 | A1* | 11/2007 | Toebes et al. ................ 725/139 |
| 2008/0089262 | A1* | 4/2008 | Crolley et al. ................ 370/312 |
| 2008/0303956 | A1* | 12/2008 | Nakagawa ..................... 348/723 |
| 2009/0023395 | A1* | 1/2009 | Chang et al. ................. 455/74.1 |
| 2009/0083412 | A1* | 3/2009 | Olaiya ............... H04L 65/1083 709/224 |
| 2009/0213825 | A1* | 8/2009 | Gupta et al. ................... 370/338 |
| 2011/0039508 | A1* | 2/2011 | Lindahl ................. H04H 40/18 455/230 |

(Continued)

FOREIGN PATENT DOCUMENTS

JP 2010-256973 11/2010

Primary Examiner — Charles Appiah
Assistant Examiner — Margaret G Mastrodonato
(74) Attorney, Agent, or Firm — Paratus Law Group, PLLC

(57) ABSTRACT

There is provided an information processing device including a communication unit that performs short-range wireless communication with another information processing device, and a control unit that performs control of supplying, via a memory, a display device with display information supplied from the other information processing device through the short-range wireless communication and causing the display device to display the display information, and supplying the display device with the display information supplied from the other information processing device and retained in the memory and causing the display device to display the display information, when a wireless communication quality of the short-range wireless communication with the other information processing device satisfies a predetermined condition.

7 Claims, 9 Drawing Sheets

(56) References Cited

U.S. PATENT DOCUMENTS

2013/0060888 A1* 3/2013 Lee .................... H04N 21/2343
709/217

* cited by examiner

FIG. 1
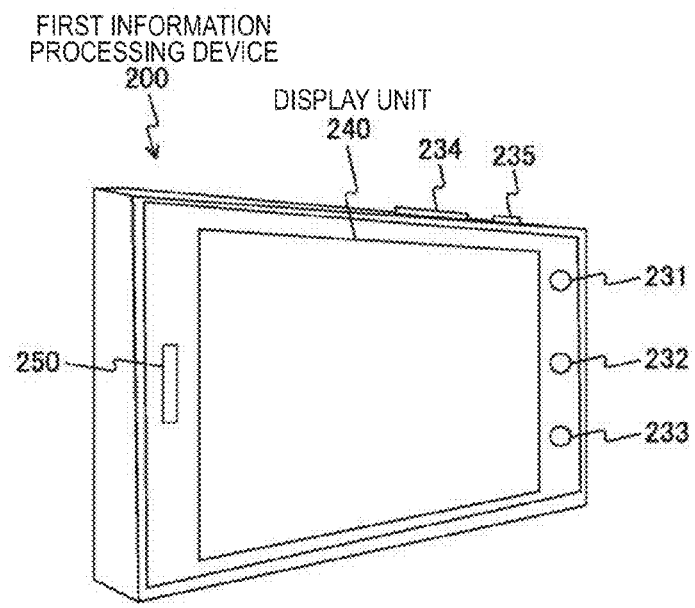
a
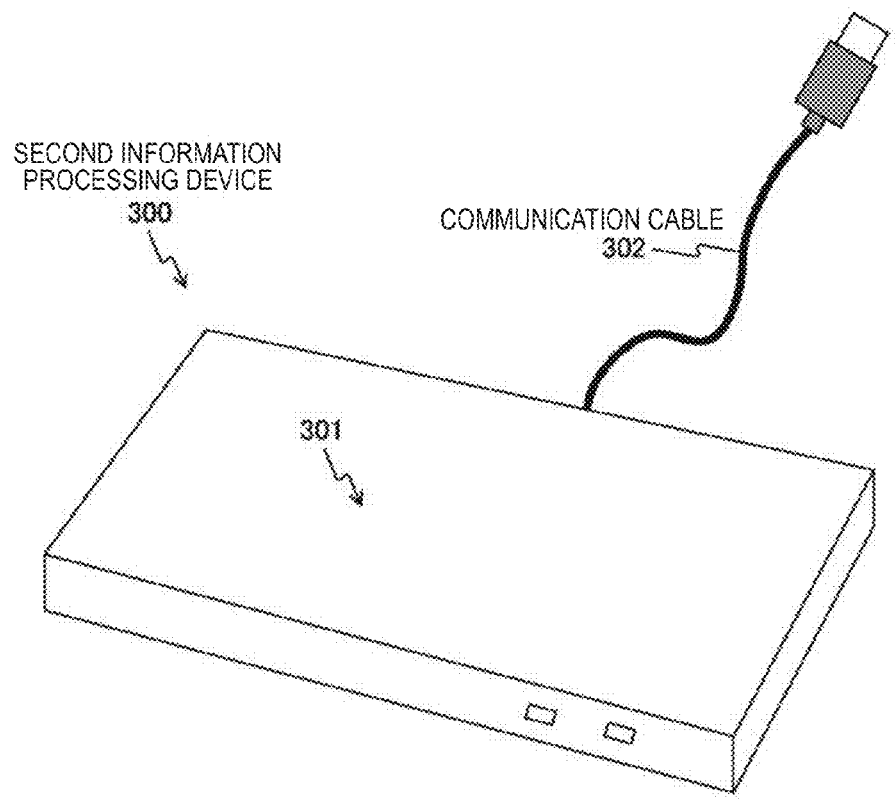
b

FIG. 2
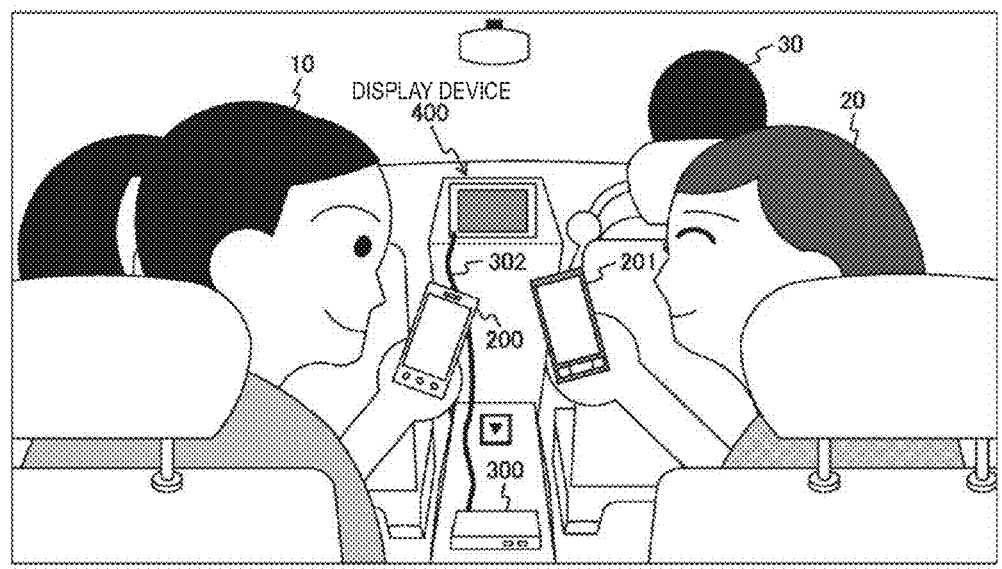
a
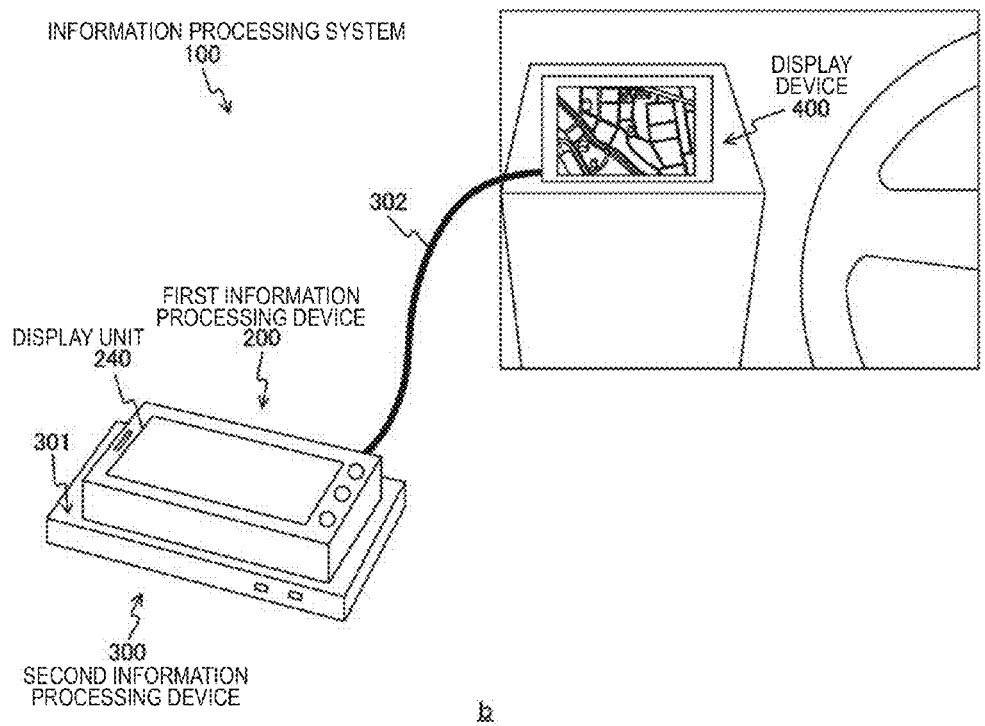
b

INFORMATION PROCESSING DEVICE, INFORMATION PROCESSING SYSTEM, AND INFORMATION PROCESSING METHOD

BACKGROUND

The present technology relates to an information processing device, and more particularly, to an information processing device, an information processing system, and an information processing method capable of performing short-range wireless communication with another information processing device.

In the past, there have been wireless communication technologies for exchanging various kinds of data using wireless communication. For example, an information processing device in which a body is connected to a display unit through short-range wireless communication has been suggested (for example, see JP 2010-256973A).

SUMMARY

In the above-mentioned related art, various kinds of information are provided from the body to the display unit using the short-range wireless communication, and thus the display unit can be caused to display the various kinds of information.

Here, for example, content can be considered to be stored in a first information processing device (for example, a smartphone) and supplied from the first information processing device to a display device using the short-range wireless communication so as to be displayed. For example, the display device is assumed not to have a short-range wireless communication function. In this case, for example, it can be considered that the first information processing device (for example, a smartphone) is mounted on a second information processing device (for example, a cradle) having a short-range communication function so that the content is supplied to the display device via the second information processing device and the display device is caused to display the content.

However, for example, when a user lifts the first information processing device from the second information processing device to operate the first information processing device mounted on the second information processing device, the short-range wireless communication is assumed to be disconnected. In this case, there is a concern that a display screen being displayed on the display device abruptly disappears. Accordingly, even in this case, it is important to cause the display device to display an appropriate display screen.

It is desirable to provide the present technology for causing a display unit to appropriately display information using short-range wireless communication.

According to a first embodiment of the present technology, there is provided an information processing device including a communication unit that performs short-range wireless communication with another information processing device, and a control unit that performs control of supplying, via a memory, a display device with display information supplied from the other information processing device through the short-range wireless communication and causing the display device to display the display information, and supplying the display device with the display information supplied from the other information processing device and retained in the memory and causing the display device to display the display information, when a wireless communication quality of the short-range wireless communication with the other information processing device satisfies a predetermined condition. Thus, it is possible to obtain the effect of supplying, via the memory, the display device with the display information supplied from the other information processing device through the short-range wireless communication and causing the display device to display the display information, and supplying the display device with the display information supplied from the other information processing device and retained in the memory and causing the display device to display the display information when the wireless communication quality of the short-range wireless communication with the other information processing device satisfies the predetermined condition.

Further, according to the first embodiment of the present technology, the control unit may perform control of supplying the display device with the display information supplied from the other information processing device and retained in the memory and causing the display device to display the display information immediately before the wireless communication quality comes into a state of satisfying the predetermined condition. Thus, it is possible to obtain the effect of supplying the display device with the display information supplied from the other information processing device and retained in the memory and causing the display device to display the display information immediately before the wireless communication quality comes into a state of satisfying the predetermined condition.

Further, according to the first embodiment of the present technology, the control unit may perform control of determining that the wireless communication quality satisfies the predetermined condition when the short-range wireless communication with the other information processing device is disconnected, and supplying the display device with the display information supplied from the other information processing device and retained in the memory and causing the display device to display the display information until the short-range wireless communication with the other information processing device is enabled. Thus, it is possible to obtain the effect of determining that the wireless communication quality satisfies the predetermined condition when the short-range wireless communication with the other information processing device is disconnected, and supplying the display device with the display information supplied from the other information processing device and retained in the memory and causing the display device to display the display information until the short-range wireless communication with the other information processing device is enabled.

Further, according to the first embodiment of the present technology, the control unit may perform control of determining that the wireless communication quality satisfies the predetermined condition when a reception signal intensity of the short-range wireless communication with the other information processing device is less than a threshold value as a reference, and supplying the display device with the display information supplied from the other information processing device and retained in the memory and causing the display device to display the display information until the reception signal intensity of the short-range wireless communication with the other information processing device is greater than the threshold value as the reference. Thus, it is possible to obtain the effect of determining that the wireless communication quality satisfies the predetermined condition when the reception signal intensity of the short-range wireless communication with the other information processing device is less than the threshold value as the reference, and supplying the display device with the display information supplied from the other information processing device and retained in the memory and causing the display device to display the display information until the reception signal intensity of the short-range wireless communication with the other information processing device is greater than the threshold value as the reference.

Further, according to the first embodiment of the present technology, the control unit may perform control of causing the display device to display the display information supplied from the other information processing device and retained in the memory and a fact that the display information retained in the memory is displayed when the wireless communication quality satisfies the predetermined condition. Thus, it is possible to obtain the effect of causing the display device to display the display information supplied from the other information processing device and retained in the memory and the fact that the display information retained in the memory is displayed when the wireless communication quality satisfies the predetermined condition.

Further, according to a second embodiment of the present technology, there is provided an information processing device, an information processing method, and a program for causing a computer to execute the method, including a communication unit that performs short-range wireless communication with another information processing device, a display unit that displays display information supplied from the other information processing device, and a control unit that performs control of supplying, via a memory, the display unit with the display information supplied from the other information processing device through the short-range wireless communication and causing the display unit to display the display information, and supplying the display unit with the display information supplied from the other information processing device and retained in the memory and causing the display unit to display the display information when a wireless communication quality of the short-range wireless communication with the other information processing device satisfies a predetermined condition. Thus, it is possible to obtain the effect of supplying, via the memory, the display unit with the display information supplied from the other information processing device through the short-range wireless communication and causing the display unit to display the display information, and supplying the display unit with the display information supplied from the other information processing device and retained in the memory and causing the display unit to display the display information when the wireless communication quality of the short-range wireless communication with the other information processing device satisfies the predetermined condition.

Further, according to a third embodiment of the present technology, there is provided an information processing system, an information processing method, and a program for causing a computer to execute the method, including a first information processing device that supplies display information using short-range wireless communication, a second information processing device that performs control of supplying, via a memory, a display device with the display information supplied from the first information processing device using the short-range wireless communication, and supplying the display device with the display information supplied from the first information processing device and retained in the memory when a wireless communication quality of the short-range wireless communication with the first information processing device satisfies a predetermined condition, and the display device that displays the display information supplied from the second information processing device. Thus, it is possible to obtain the effect of supplying, via the memory, the display device with the display information supplied from the first information processing device through the short-range wireless communication, and supplying the display device with the display information supplied from the first information processing device and retained in the memory when the wireless communication quality of the short-range wireless communication with the first information processing device satisfies the predetermined condition.

According to the embodiments of the present technology, it is possible to obtain the excellent advantage of causing the display unit to appropriately display the display information using the short-range wireless communication.

BRIEF DESCRIPTION OF THE DRAWINGS

FIG. 1 is perspective views illustrating examples of outer appearances of first and second information processing devices according to a first embodiment of the present technology;

FIG. 2 is diagrams illustrating a use example of the first and second information processing devices according to the first embodiment of the present technology;

DETAILED DESCRIPTION OF THE EMBODIMENTS

Figure 3:
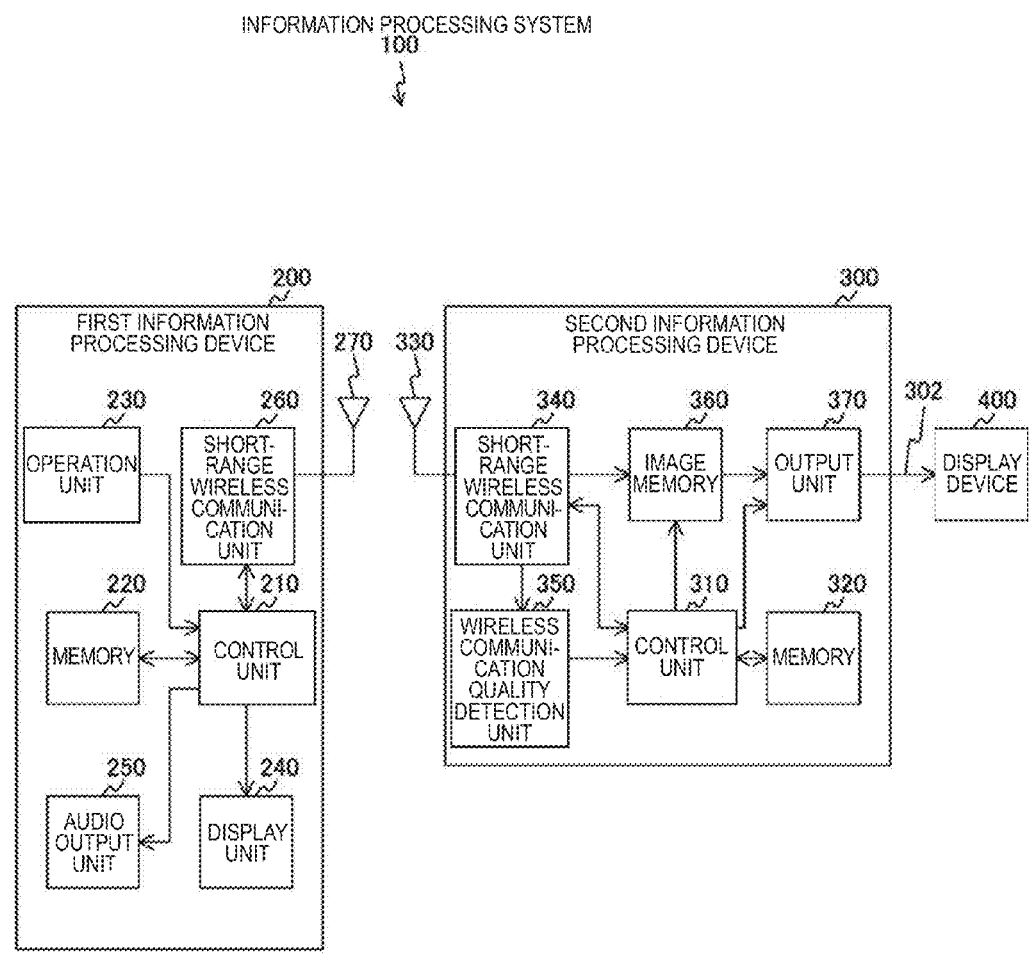
FIG. 3 is a block diagram illustrating an example of the configuration of an information processing system according to the first embodiment of the present technology.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, modes (hereinafter referred to as embodiments) for carrying out the present technology will be described. The description will be made in the following order.

1. First Embodiment (Display Information Supply Control: Example in Which Each Display Device (Navigation Device) Is Caused to Display Information Using Short-Range Wireless Communication)

2. Second Embodiment (Display Information Supply Control: Example in Which Information Processing Device Includes Display Unit)

3. Third Embodiment (Display Information Supply Control: Example in Which Each Display Device (Projector) Is Caused to Display information Using Short-Range Wireless Communication)

1. First Embodiment

Examples of Outer Appearances of First and Second Information Processing Devices FIG. 1 is perspective views illustrating examples of outer appearances of a first information processing device 200 and a second information processing device 300 according to a first embodiment of the present technology. FIG. 1a illustrates the outer appearance of the first information processing device 200. FIG. 1b illustrates the outer appearance of the second information processing device 300.

The first information processing device 200 includes a first button 231 to a fifth button 235, a display unit 240, and an audio output unit 250. For example, the first information processing device 200 is realized by a wireless communication device (for example, a portable telephone device or a smartphone (so-called mobile terminal) having a telephone call function and a data communication function) capable of displaying various images. The first information processing device 200 can further include other operation members, but the illustration and description thereof will be omitted.

The first button 231 to the fifth button 235 are operation members on which respective operations are performed in the first information processing device 200.

The display unit 240 is a display panel that displays various images. Further, a touch panel (also referred to as a touch screen) that displays various images and also receives an operation input from a user based on a detection state of an object closely approaching or coming into contact with a display surface may be used as the display unit 240.

The audio output unit 250 is a speaker that outputs various kinds of audio information. For example, the audio output unit 250 is used when a telephone call is performed or content is reproduced.

The second information processing device 300 includes a mounting surface 301 and a communication cable 302. For example, the second information processing device 300 is realized by an information processing device capable of outputting information received from another electronic device (for example, the first information processing device 200) using short-range wireless communication to any other electronic device (for example, a display device 400 illustrated in FIG. 2). The second information processing device 300 is, for example, a cradle that includes a touch point connected by the short-range wireless communication. The second information processing device 300 can further include other operation members, but the illustration and description thereof will be omitted.

The mounting surface 301 is a surface on which an electronic device (for example, the first information processing device 200) performing the short-range wireless communication is mounted and is a surface having a touch point configured to perform the short-range wireless communication.

The communication cable 302 is a communication cable through which information received using the short-range wireless communication is output to another electronic device. For example, a universal serial bus (USB) cable can be used as the communication cable 302.

Here, in the first embodiment of the present technology, an example in which TransferJet (registered trademark) is used as the short-range wireless communication will be described. TransferJet is a short-range wireless communication scheme using a 4.48 GHz band. High-rate short-range data communication of the maximum 560 Mbps can be realized using radio waves of 4.48 GHz at −70 dBm/MHz or less in conformity with the communication protocol (TransferJet). By restricting a communication distance of the short-range wireless communication to a few cm, a communication process can be performed at a high-rate and an electronic device can be miniaturized, thereby achieving power-saving.

[Use Example of First and Second Information Processing Devices]

FIG. 2 is diagrams illustrating a use example of the first information processing device 200 and the second information processing device 300 according to the first embodiment of the present technology. FIG. 2a illustrates an example of a location (the inside of a vehicle) in which the first information processing device 200 and the second information processing device 300 are used. FIG. 2b illustrates an example of a use state (a use state of an information processing system 100) of the first information processing device 200 and the second information processing device 300.

FIG. 2 illustrates the use example in which the second information processing device 300 is connected to the display device 400. Here, the display device 400 is a display device (for example, a liquid crystal display) capable of displaying various images based on various kinds of information supplied from an external device. For example, a navigation device can be used.

As illustrated in FIG. 2a, the display device 400 is installed on the front surface of a middle portion between a driver's seat and a passenger's seat in the inside of the vehicle, and the second information processing device 300 is installed in a middle portion of the inside of the vehicle. The second information processing device 300 and the display device 400 are assumed to be connected to each other via the communication cable 302. A person 10 seated in a backseat holds the first information processing device 200 with his or her hand and a person 20 seated in a backseat holds a first information processing device 201 with his or her hand. A person (driver) 30 seated in the driver's seat is assumed not to operate the first information processing devices 200 and 201 while driving the vehicle.

Here, a case in which navigation information displayed on the first information processing device 200 is also displayed on the display device 400 is assumed. For example, the person 10 seated on the backseat activates a navigation application in the first information processing device 200 held with his or her hand. After activating the navigation application, as illustrated in FIG. 2b, the person 10 places the first information processing device 200 on the mounting surface 301 of the second information processing device 300. Thus, when the person 10 places the first information processing device 200 on the mounting surface 301 of the second information processing device 300, the short-range wireless communication is performed between the first information processing device 200 and the second information processing device 300. Through the short-range wireless communication, various screens displayed on the first information processing device 200 are supplied to the display device 400 via the second information processing device 300 and are also displayed on the display device 400.

Here, a case in which navigation information from the first information processing device 200 is displayed on the display device 400 is assumed. In this case, for example, when the person 10 receives a telephone call or desires to perform any operation on the first information processing device 200, the person 10 is assumed to lift the first information processing device 200.

Here, when TransferJet is used as the short-range wireless communication, a communication distance in the short-range wireless communication is restricted to a few cm. Therefore, for example, when the person 10 lifts the first information processing device 200, the short-range wireless communication between the first information processing device 200 and the second information processing device 300 may be disconnected. Thus, when the short-range wireless communication is disconnected, the navigation information from the first information processing device 200 is not supplied to the display device 400. Therefore, the display screen of the navigation information displayed on the display device 400 may disappear in some cases.

Accordingly, in the first embodiment of the present technology, an example in which the navigation information from the first information processing device 200 is appropriately displayed on the display device 400 even when the short-range wireless communication between the first information processing device 200 and the second information processing device 300 is disconnected will be described.

[Example of Configuration of Information Processing System]

FIG. 3 is a block diagram illustrating an example of the configuration of the information processing system 100 according to the first embodiment of the present technology. The information processing system 100 includes the first information processing device 200, the second information processing device 300, and the display device 400.

The first information processing device 200 includes a control unit 210, a memory 220, an operation unit 230, a display unit 240, an audio output unit 250, a short-range wireless communication unit 260, and an antenna 270. The first information processing device 200 can perform communication using a 3G ($3^{rd}$ generation: $3^{rd}$ generation portable telephone) network. However, a detailed description of each function relevant to this communication will not be given here.

The control unit 210 controls a process of each unit of the first information processing device 200 based on a control program stored in the memory 220. For example, the control unit 210 includes a central processing unit (CPU). For example, the control unit 210 is connected to the short-range wireless communication unit 260 and controls transmission and reception of various kinds of data performed with another electronic device connected via the short-range wireless communication unit 260.

The memory 220 is a memory that stores a control program (for example, various application programs or a communication control program executed to control short-range wireless communication performed by the short-range wireless communication unit 260) executed for the control unit 210 to perform various kinds of control, transmission data, reception data, and the like. For example, the memory 220 includes a read-only memory (ROM) or a random access memory (RAM). For example, the memory 220 stores display information causing the display unit 240 to display various images. The display information stored in the memory 220 is transmitted via the short-range wireless communication unit 260 and the antenna 270.

The operation unit 230 is an operation unit that receives an operation performed by the user and outputs a control signal (operation information) according to details of the received operation to the control unit 210. The operation unit 230 corresponds to, for example, the first button 231 to the fifth button 235 illustrated in FIG. 1.

The display unit 240 is a display panel that displays each image under the control of the control unit 210. The audio output unit 250 is a speaker that output various kinds of audio information.

The short-range wireless communication unit 260 is a communication module that performs short-range wireless communication in conformity with the TransferJet standard under the control of the control unit 210. That is, the short-range wireless communication unit 260 performs the short-range wireless communication with another electronic device (an electronic device having a short-range wireless communication function) present within a predetermined communication range from the short-range wireless communication unit 260 (the antenna 270). Here, the short-range wireless communication between the short-range wireless communication unit 260 and the other electronic device can be performed only when the short-range wireless communication unit 260 and the other electronic device are in a proximity state. Here, for example, the proximity state means a state in which the short-range wireless communication unit 260 approaches or comes into contact with the other electronic device within a predetermined range (for example, 3 cm). Further, the short-range wireless communication unit 260 and the antenna 270 may be configured as one module.

The antenna 270 is an antenna that is connected to the short-range wireless communication unit 260, and transmits and receives a radio wave to and from another electronic device (for example, the second information processing device 300) by a wireless signal using an induced electric field/magnetic field.

The second information processing device 300 includes the communication cable 302, a control unit 310, a memory 320, an antenna 330, a short-range wireless communication unit 340, a wireless communication quality detection unit 350, an image memory 360, and an output unit 370.

The control unit 310 controls a process of each unit of the second information processing device 300 based on a control program stored in the memory 320. For example, the control unit 310 includes a central processing unit (CPU). For example, the control unit 310 is connected to the short-range wireless communication unit 340 and controls transmission and reception of various kinds of data performed with another electronic device connected via the short-range wireless communication unit 340. The control unit 310 performs control of outputting display information from another electronic device (for example, the first information processing device 200) connected via the short-range wireless communication unit 340 to any other electronic device (for example, the second information processing device 300).

The memory 320 is a memory that stores a control program (for example, a communication control program executed to control the short-range wireless communication performed by the short-range wireless communication unit 340) executed for the control unit 310 to perform various kinds of control and the like. For example, the memory 320 includes a ROM or a RAM.

The antenna 330 is an antenna that is connected to the short-range wireless communication unit 340, and transmits and receives radio waves to and from another electronic device (for example, the first information processing device 200) by a wireless signal using an induced electric field/magnetic field.

The short-range wireless communication unit 340 is a communication module that performs short-range wireless communication in conformity with the TransferJet standard under the control of the control unit 310. That is, the short-range wireless communication unit 340 performs the short-range wireless communication with another electronic device (an electronic device having a short-range wireless communication function) present within a predetermined communication range from the short-range wireless communication unit 340 (the antenna 330). The short-range wireless communication unit 340 outputs various kinds of information regarding the short-range wireless communication to the control unit 310 and the wireless communication quality detection unit 350. The short-range wireless communication unit 340 supplies an image signal (image data) received and demodulated through the short-range wireless communication to the image memory 360 so that the image memory 360 retains the image signal. The short-range wireless communication unit 340 and the antenna 330 may be configured as one module. The short-range wireless communication unit 340 is an example of a communication unit according to an embodiment of the present technology.

The wireless communication quality detection unit 350 detects a wireless communication quality (communication state) of the short-range wireless communication unit 340 and outputs the detection result to the control unit 310. For example, the wireless communication quality detection unit 350 detects disconnection of the short-range wireless communication from the short-range wireless communication unit 340 as the wireless communication quality (communication state) of the short-range wireless communication unit 340.

Here, when the wireless communication quality is determined, for example, Receive Signal Strength indication (RSSI) can be used. Specifically, for example, the wireless communication quality detection unit 350 sequentially measures the RSSI output from the short-range wireless communication unit 340. When the RSSI is equal to or less than a threshold value, the wireless communication quality detection unit 350 can determine that the short-range wireless communication by the short-range wireless communication unit 340 is disconnected. In this case, the wireless communication quality detection unit 350 outputs the detection result (disconnection detection signal) to the control unit 310.

Here, the threshold value is a preset value. For example, when the wireless communication quality is determined using the RSSI, a value of about a ⅓ of the maximum value can be set as the threshold value. Thus, by setting the threshold value, the short-range wireless communication can be determined to be disconnected even when a distance between the information processing devices is near a boundary in which the short-range wireless communication can be performed. Thus, by determining the disconnection of the short-range wireless communication, an image (for example, a map) displayed on the display device 400 can be kept from being separated.

The image memory 360 is a memory that retains an image signal (image data) received through the short-range wireless communication by the short-range wireless communication unit 340 and supplies the retained image signal (image data) to an external electronic device via the output unit 370.

Here, for example, a memory configured by a D-FF (Delay Flip Flop) with an EN (enable) can be used as the image memory 360. As the image memory 360, a memory that can buffer at least an image corresponding to one screen on a display surface of an external electronic device (for example, the display device 400) is assumed to be used. The image memory 360 is an example of a memory according to an embodiment of the present technology.

The output unit 370 outputs the image signal (image data) retained in the image memory 360 to an external electronic device (for example, the display device 400) via the communication cable 302.

[Example of Configuration of Memory]

Figure 4:
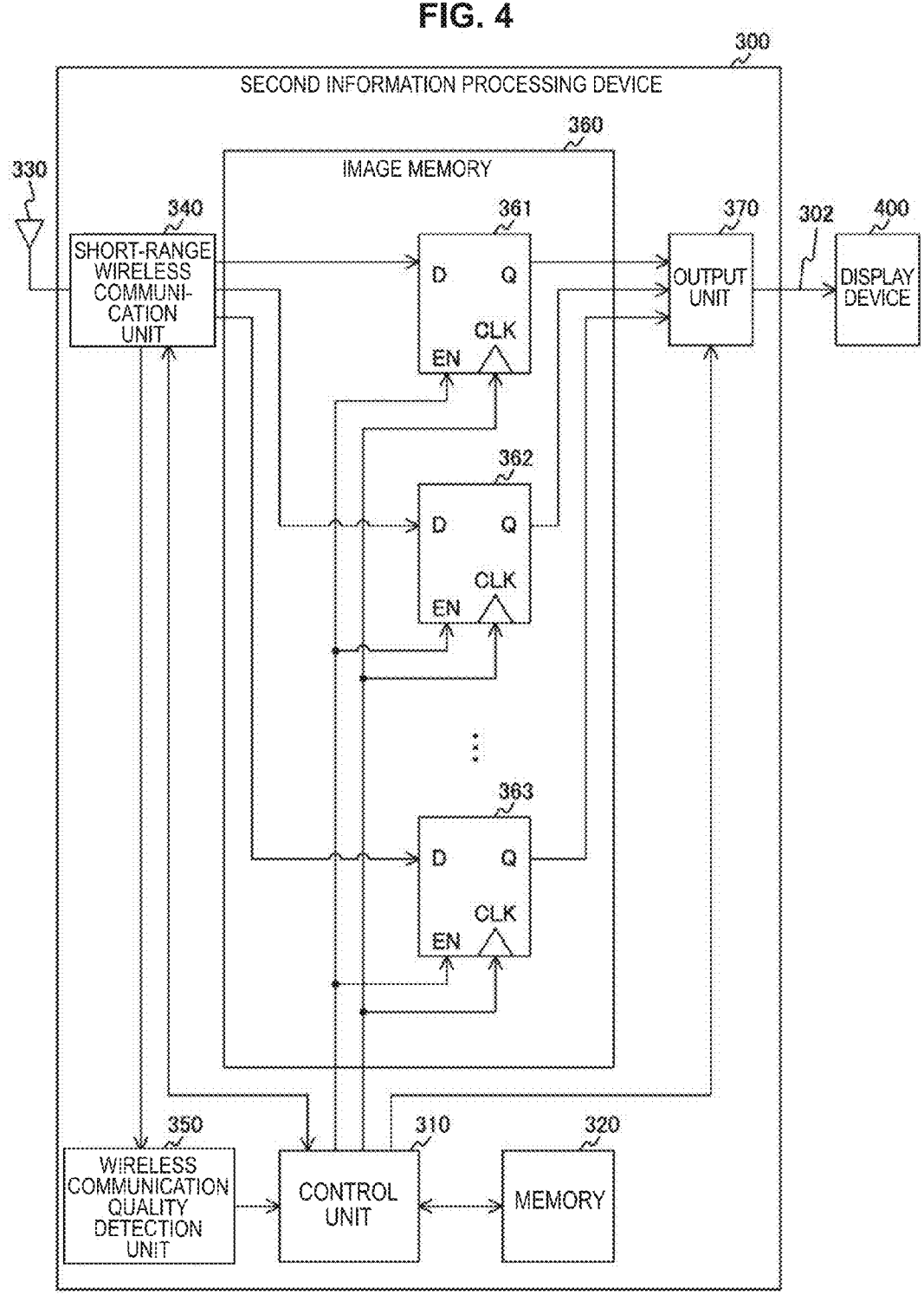
FIG. 4 is a diagram illustrating an example of the configuration of an image memory according to the first embodiment of the present technology.

FIG. 4 is a diagram illustrating an example of the configuration of the image memory 360 according to the first embodiment of the present technology. FIG. 4 illustrates not only the image memory 360 but also the units of the second information processing device 300.

As described above, the image data (display information) received and demodulated by the short-range wireless communication unit 340 is supplied and retained in the image memory 360. The image data retained in the image memory 360 is supplied to an external electronic device (for example, the display device 400) via the communication cable 302 based on control signals (EN signal and CLK) of the control unit 310.

The image memory 360 includes D-FFs with N ENs. In FIG. 4, only three D-FFs 361 to 363 with ENs are illustrated and the other D-FFs with ENs are not illustrated to facilitate the description.

The number of the D-FFs is assumed to a number by which at least an image corresponding to one screen to be displayed on a display surface of an external electronic device (for example, the display device 400) can be generated.

Here, the control unit 310 outputs an EN signal based on a detection result (disconnection detection signal) from the wireless communication quality detection unit 350. Specifically, when the control unit 310 does not receive the disconnection detection signal as the detection result from the wireless communication quality detection unit 350, the control unit 310 sets the EN signal to be active. Conversely, when the control unit 310 receives the disconnection detection signal as the detection result from the wireless communication quality detection unit 350, the control unit 310 sets the EN signal to be non-active. Thus, when the control unit 310 receives the disconnection detection signal as the detection result from the wireless communication quality detection unit 350, the control unit 310 stops the writing of the image memory 360 by the EN signal.

For example, when the EN signal from the control unit 310 is active, the value of input image data D is output from Q as a normal process. Conversely, when the EN signal from the control unit 310 is non-active, image data immediately before the already retained image data is output from Q due to the fact that there is no input of the image data.

Accordingly, even when the short-range wireless communication is disconnected between the first information processing device 200 and the second information processing device 300, the display screen displayed immediately before the disconnection is displayed on the display device 400. Thus, since the image memory 360 is included in the second information processing device 300, it is not necessary for the display device 400 to include an image memory corresponding to the image memory 360.

[Example of Process of Second Information Processing Device]

Figure 5:
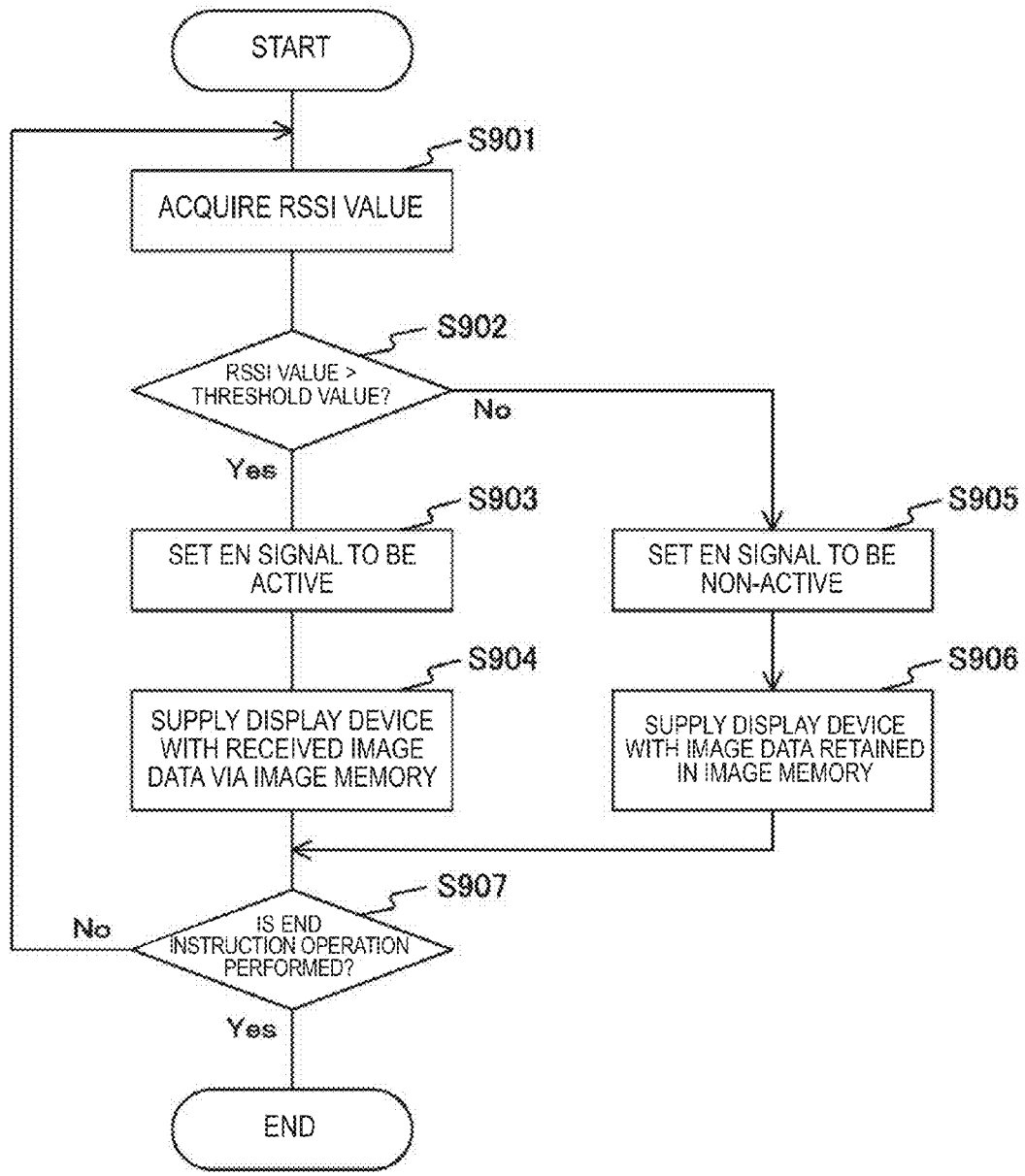
FIG. 5 is a flowchart illustrating an example of a processing order of a display information supply controlling process by the second information processing device according to the first embodiment of the present technology.

FIG. 5 is a flowchart illustrating an example of the processing order of a display information supply controlling process performed by the second information processing device 300 according to the first embodiment of the present technology.

First, the wireless communication quality detection unit 350 acquires an RSSI value from the short-range wireless communication unit 340 (step S901). Subsequently, the wireless communication quality detection unit 350 compares the acquired RSSI value to the threshold value to determine whether the acquired RSSI value is greater than the threshold value (step S902).

When the acquired RSSI value is greater than the threshold value (step S902), the control unit 310 sets the EN signal of the image memory 360 to be active (step S903). Subsequently, the image data received by the short-range wireless communication unit 340 is retained in the image memory 360, and the image data retained in the image memory 360 is supplied to the display device 400 (step S904). That is, normal writing is performed in the image memory 360 and normal display is performed in the display device 400 (step S904). Step S902 to step S904 are an example of a first display step according to an embodiment of the present technology.

When the acquired RSSI value is equal to or less than the threshold value (step S902), the control unit 310 sets the EN signal of the image memory 360 to be non-active (step S905). Subsequently, the image data retained in the image memory 360 is supplied to the display device 400 (step S906). That is, the writing of the image data on the image memory 360 is stopped and the immediately previously retained image data is displayed on the display device 400 (step S906). Step S902, step S905, and step S906 are an example of a second display step according to an embodiment of the present technology.

Subsequently, when it is determined whether an end instruction operation is performed (step S907) and the end instruction operation is not performed, the process returns to step S901. When the end instruction operation is performed, the display information supply controlling process ends.

Thus, the control unit 310 performs the control of supplying the image data (display information) supplied from the first information processing device 200 through the short-range wireless communication to the display device 400 via the image memory 360 and causing the display device 400 to display the image data. Here, a case in which a wireless communication quality of the short-range wireless communication with the first information processing device 200 satisfies a predetermined condition is assumed. The case in which the wireless communication quality satisfies the predetermined condition is, for example, a case in which a reception signal intensity of the short-range wireless communication is less than a threshold value as a reference or a case in which the short-range wireless communication is disconnected. In this case, the control unit 310 performs the control of supplying the display device 400 with the image data (display information) supplied from the first information processing device 200 and retained in the image memory 360 and causing the display device 400 to display the image data.

Specifically, the control unit 310 performs the control of supplying the display device 400 with the image data (display information) supplied from the first information processing device 200 and retained in the image memory 360 and causing the display device 400 to display the image data immediately before the wireless communication quality comes into a state of satisfying the predetermined condition.

The control unit 310 performs the control of supplying the display device 400 with the image data (display information) supplied from the first information processing device 200 and retained in the image memory 360 and causing the display device 400 to display the image data until the short-range wireless communication with the first information processing device 200 is enabled.

The control unit 310 performs the control of supplying the display device 400 with the image data (display information) retained in the image memory 360 and causing the display device 400 to display the image data until the reception signal intensity of the short-range wireless communication with the first information processing device 200 is greater than the threshold value as the reference.

Thus, for example, navigation information (for example, a map screen) can be displayed on the display device 400 installed in a vehicle using the navigation function of the first information processing device 200. In this case, for example, even when the first information processing device 200 is separated from the second information processing device 300, the immediately previous map screen can be retained. Accordingly, the navigation screen does not abruptly disappear, and thus the driver can continue to drive comfortably.

Example of Overlapping Display of Message on Still Image

The example in which the image data already retained in the image memory 360 is displayed on the display device 400 while the RSSI value is equal to or less than the threshold value has been described. Here, for example, by notifying the user of not only the image data already retained in the image memory 360 but also the fact that the image data retained in the image memory 360 is displayed, the user is considered to understand the fact quickly. Accordingly, hereinafter, an example in which the user is notified of not only the image data retained in the image memory 360 but also the fact that the image data retained in the image memory 360 is displayed will be described.

Display Transition Example of Display Device

Figure 6:
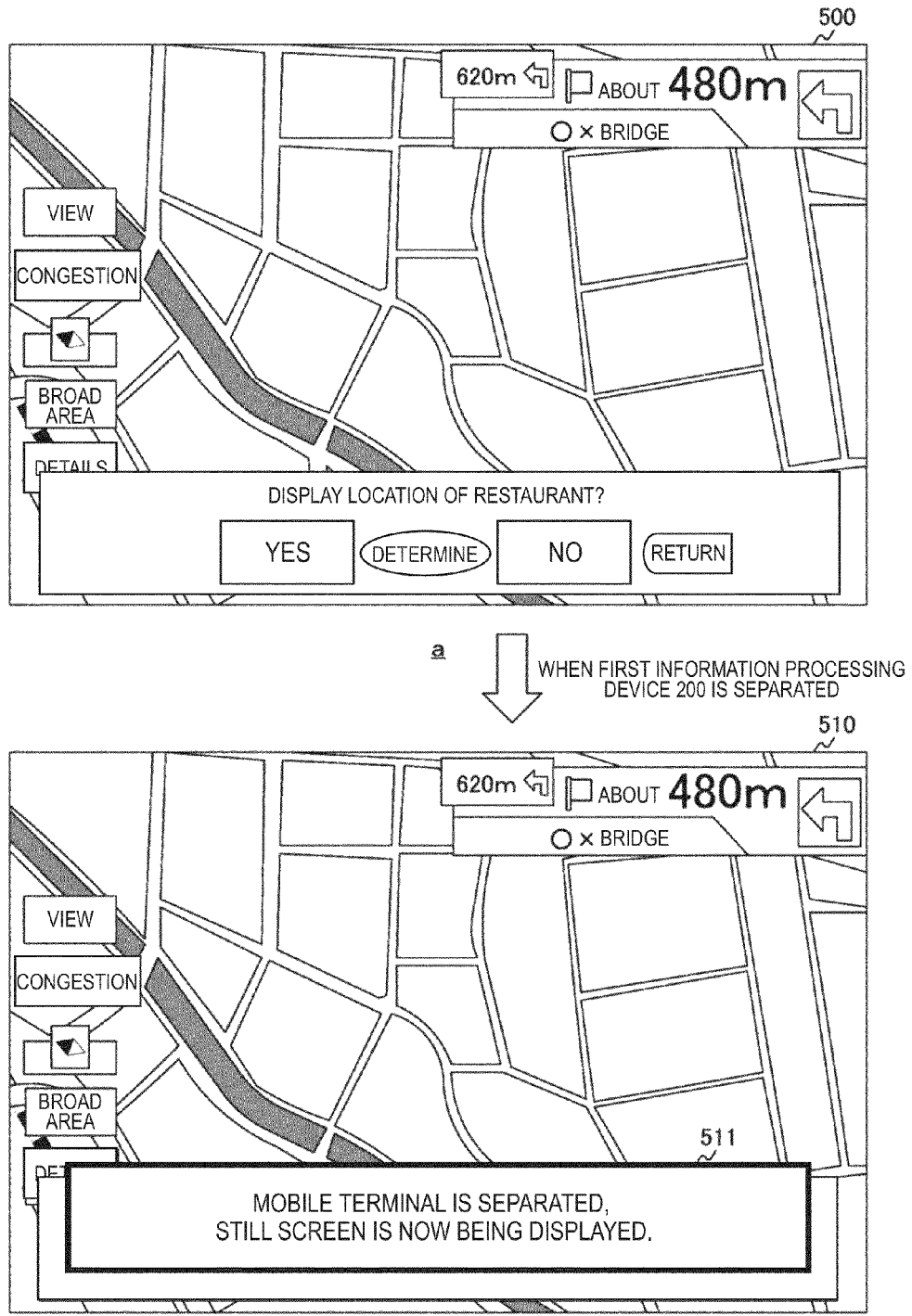
FIG. 6 is diagrams illustrating a transition example of a display screen displayed on a display device according to the first embodiment of the present technology.

FIG. 6 is diagrams illustrating a transition example of a display screen displayed on the display device 400 according to the first embodiment of the present technology.

FIG. 6a illustrates an example (display screen 500) of the display screen of the navigation information displayed on the display device 400 when the first information processing device 200 is mounted on the mounting surface 301 of the second information processing device 300.

FIG. 6b is a diagram illustrating an example (display screen 510) of the display screen of the navigation information displayed on the display device 400 when the first information processing device 200 is separated from the mounting surface 301 of the second information processing device 300.

The display screen 510 is a display screen in which a message display area 511 is overlapped on the display screen 500 and is displayed. For example, "MOBILE TERMINAL IS SEPARATED, STILL SCREEN IS NOW BEING DISPLAYED," is displayed in the message display area 511. Further, other information may be displayed in the message display area 511. For example, "THIS SCREEN IS STILL SCREEN," "MOBILE TERMINAL MAY BE SEPARATED; PLEASE RETURN MOBILE TERMINAL," "PLEASE RETURN MOBILE TERMINAL," "STILL SCREEN IS DISPLAYED UNTIL MOBILE TERMINAL IS RETURNED TO CRADLE," or the like may be displayed.

[Process Example of Second Information Processing Device]

Figure 7:
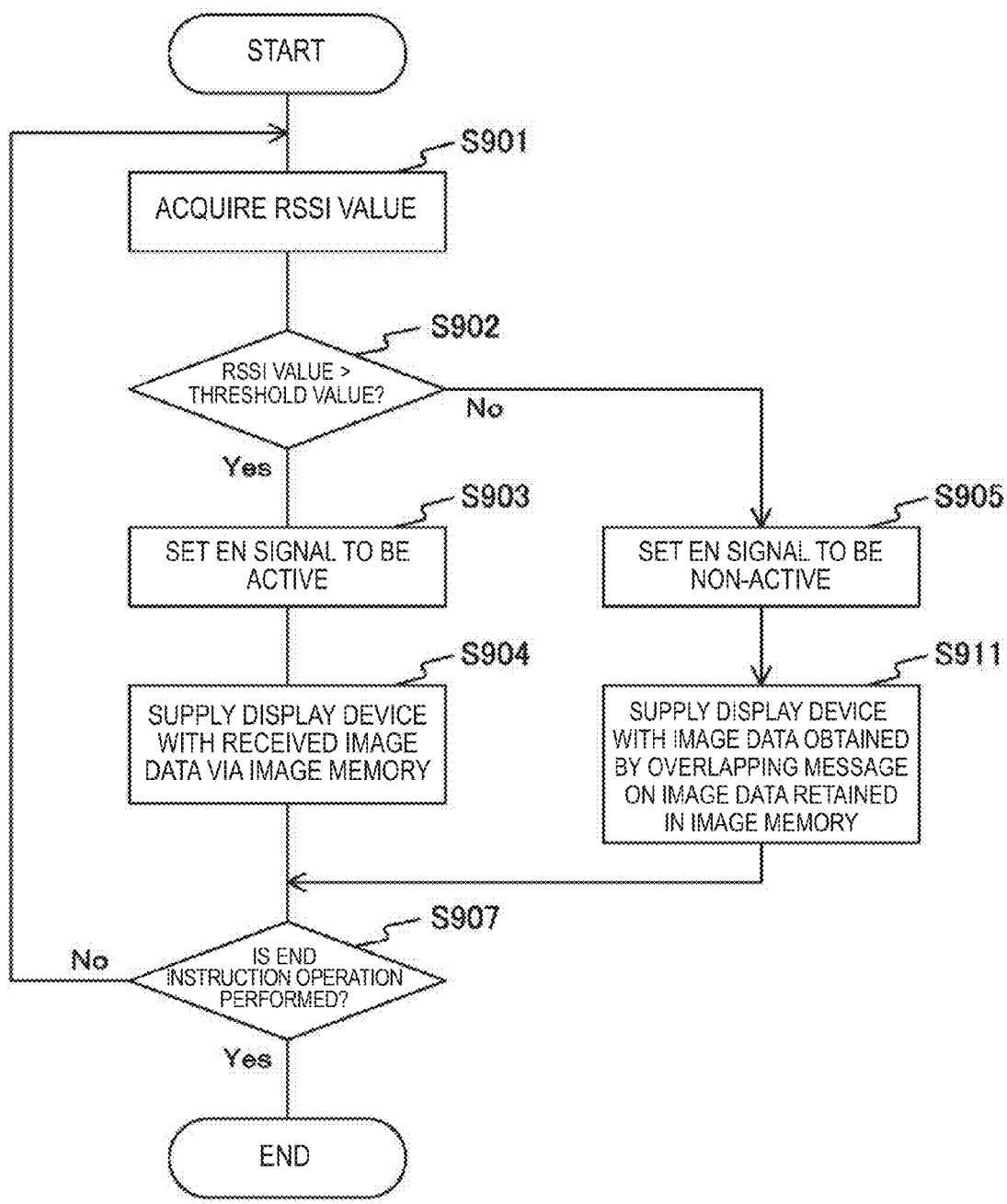
FIG. 7 is a flowchart illustrating an example of a processing order of a display information supply controlling process by the second information processing device according to the first embodiment of the present technology.

FIG. 7 is a flowchart illustrating an example of the processing order of a display information supply controlling process performed by the second information processing device 300 according to the first embodiment of the present technology. Since FIG. 7 is a modification example of FIG. 5, the same reference numerals are given to the same portions as those of FIG. 5 and the description thereof will be partially omitted.

After the control unit 310 sets the EN signal of the image memory 360 to be non-active (step S905), the control unit 310 overwrites a predetermined message on the image data retained in the image memory 360. The image data on which the predetermined message is overwritten is supplied to the display device 400 (step S911). That is, the writing of the image data on the image memory 360 is stopped, and the predetermined message (for example, the message display area 511 illustrated in FIG. 6b) is displayed together with the immediately previously retained image data on the display device 400 (step S911).

Thus, the control unit 310 performs the control of causing the display device 400 to display the image data (display information) retained in the image memory 360 and the fact that the image data (display information) retained in the image memory 360 is displayed when the wireless communication quality satisfies the predetermined condition.

Thus, by displaying the predetermined message together with the immediately previously retained image data, the user (for example, the person 30 illustrated in FIG. 2a) can easily understand the notice of a "still screen," while driving, even when the display screen of the navigation information is abruptly stopped. Further, when the message is displayed, the user can urge that the first information processing device 200 be returned to the mounting surface 301 of the second information processing device 300 while driving.

2. Second Embodiment

In the first embodiment of the present technology, the example in which the navigation information from the first information processing device (for example, a smartphone) is displayed on another display device via the second information processing device (for example, a cradle) has been described. Here, the first embodiment of the present technology can be applied even to a device in which the second information processing device and the display device are integrally configured.

Next, in a second embodiment of the present technology, an example of the device the second information processing device and the display device are integrally configured will be described.

[Example of Configuration of Information Processing System]

Figure 8:
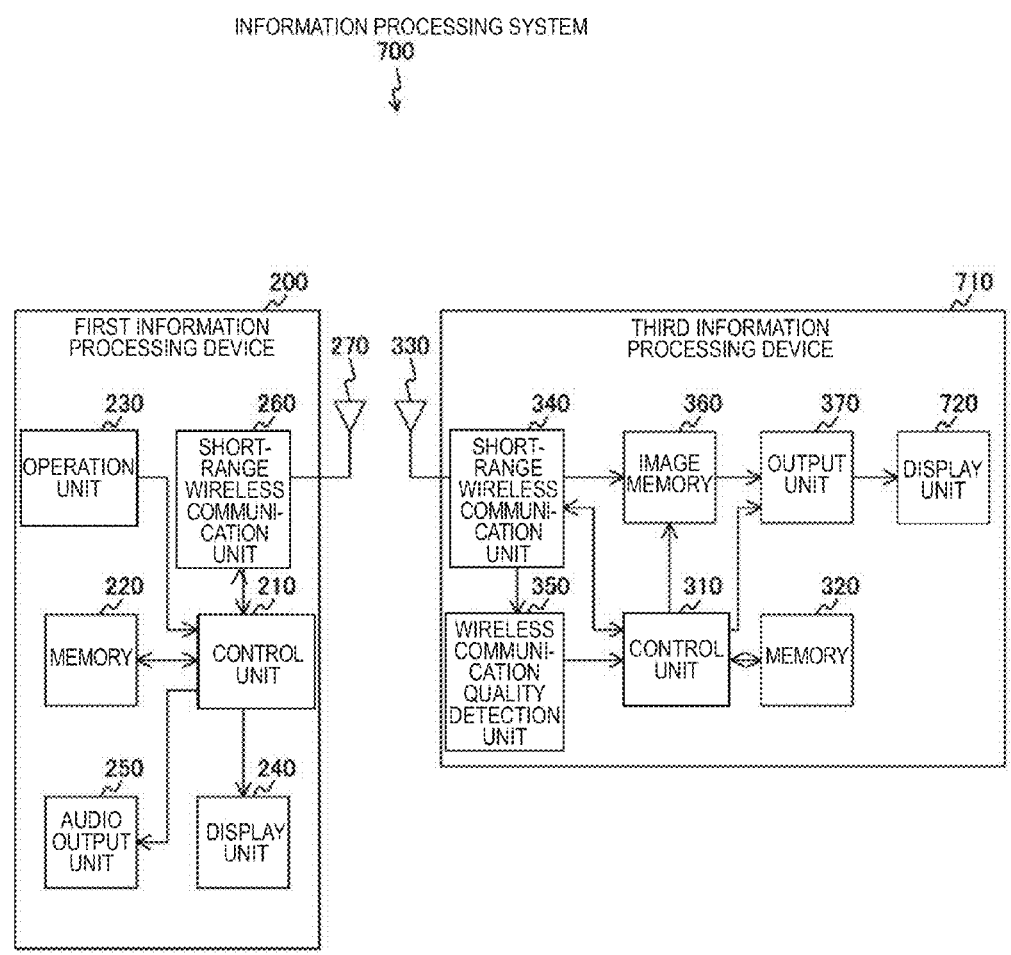
FIG. 8 is a block diagram illustrating an example of the configuration of an information processing system according to a second embodiment of the present technology.

FIG. 8 is a block diagram illustrating an example of the configuration of an information processing system 700 according to the second embodiment of the present technology.

The information processing system 700 includes a first information processing device 200 and a third information processing device 710. The first information processing device 200 is the same as that of the example illustrated in FIG. 3. The third information processing device 710 is an example of a device in which the second information processing device 300 and the display device 400 illustrated in FIG. 3 are integrally configured. Therefore, the same reference numerals are given to units common to the units of the first embodiment of the present technology and the description thereof will be partially omitted.

The third information processing device 710 includes a control unit 310, a memory 320, an antenna 330, a short-range wireless communication unit 340, a wireless communication quality detection unit 350, an image memory 360, an output unit 370, and a display unit 720.

The output unit 370 outputs an image signal (image data) retained in the image memory 360 to the display unit 720.

The display unit 720 is a display panel that displays the image data or the like output from the output unit 370. As the display unit 720, for example, an organic electro-luminescence (EL) panel, a liquid crystal display (LCD), or the like can be used.

3. Third Embodiment

In the first embodiment of the present technology, the example in which the navigation information is displayed on the display device installed inside the vehicle has been described. Here, for example, it is assumed that display information is stored in a smartphone and the display information is displayed by a projector used outside.

Accordingly, in a third embodiment of the present technology, an example in which display information is output to another electronic device will be described. The configuration of an information processing device according to the third embodiment of the present technology is substantially the same as the exemplary configuration illustrated in FIGS. 2a, 2b, 3, and the like. Therefore, the same reference numerals are given to units common to units of the first embodiment of the present technology and the description thereof will be partially omitted.

Example in which Projector is Used.

Figure 9:
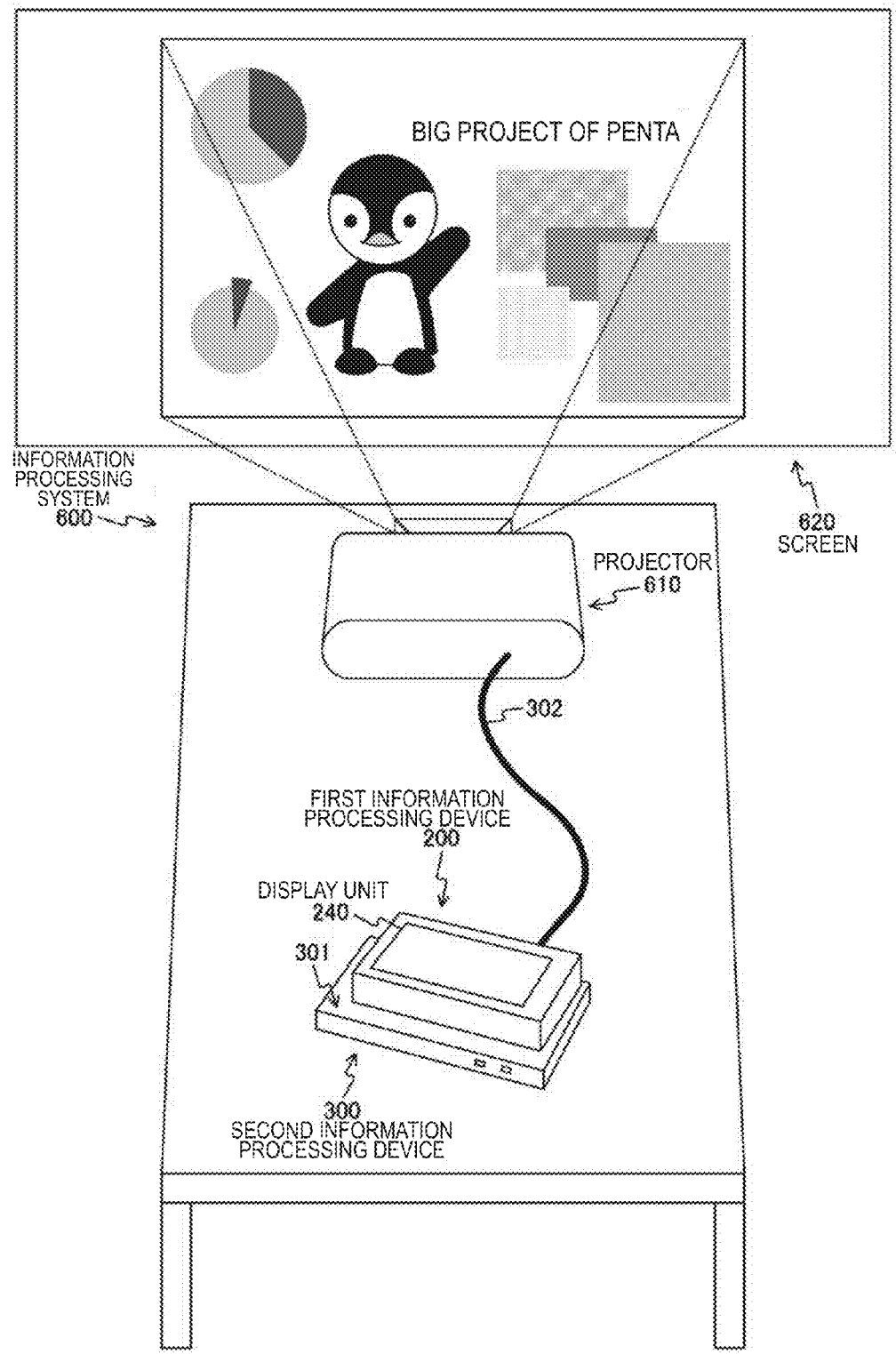
FIG. 9 is a perspective view illustrating the entire configuration of an information processing system according to a third embodiment of the present technology.

FIG. 9 is a perspective view illustrating the entire configuration of an information processing system 600 according to the third embodiment of the present technology.

The information processing system 600 includes a first information processing device 200, a second information processing device 300, and a projector 610. The second information processing device 300 and the projector 610 are connected to each other by a communication cable 302.

The projector 610 is a device that displays each image by enlarging and projecting each image on a screen 620.

Here, for example, when image data is stored in the first information processing device 200 and the image data is displayed by the projector 610 used outside, it is assumed that the first information processing device 200 is separated from the second information processing device 300 due to an unexpected telephone call or the like. Even in this case, immediately previous information can be displayed without change.

The embodiments of the present technology can be applied even to a case in which display information is output to a display device (for example, a video viewing device such as a television) other than the display device 400 such as a navigation device and the projector 610.

In recent years, smartphones or tablet personal computers (PCs) have rapidly been spread. In particular, central processing units (CPU) have considerably been advanced and smartphones including CPUs having the same performance as PCs of a decade ago are also present. Therefore, currently, presentation content is stored in a smartphone or a tablet PC and the content is output from the smartphone or the tablet PC in many cases. For example, the presentation content stored in the smartphone or the tablet PC is assumed to be displayed on a liquid crystal display used outside or to be projected by the projector and displayed on a screen.

In recent years, short-range wireless communication technologies (for example, TransferJet) by which electronic devices approach each other or come into contact with each other for use have become widespread. In the short-range wireless communication technologies, a sequence of selecting a communication partner can be switched by a touching action. Therefore, when the short-range wireless communication technologies are combined particularly with mobile devices with small liquid crystal screens or keyboards, efficiency can be achieved, and thus the short-range wireless communication technologies have become popular.

As described above, devices basically come into contact with each other for use in short-range wireless communication technologies. Therefore, for example, when content stored in a smartphone is displayed on a liquid crystal display using a short-range wireless communication technology, the smartphone is mounted on a reception device (for example, a cradle) for use. In this case, for example, when the smartphone is lifted to operate the smartphone, there is a concern that the short-range wireless communication may be disconnected. For example, when the smartphone is used for navigation or the like, there is a concern that a display screen may abruptly disappear. That is, a communication-enabled range of Transferjet is a few of cm. Therefore, when electronic devices are separated slightly, there is a high probability that wireless communication may be disconnected.

Accordingly, in the embodiments of the present technology, the image memory 360 is included in the second information processing device 300. Therefore, even when the first information processing device 200 used in a close or contact state is connected to a display device for use, appropriate display information can be displayed on the display device even when a user moves the first information processing device 200 and the communication is interrupted. That is, since the immediately previously displayed image data is read from the image memory 360 and is continuously displayed, convenience can be improved.

In the embodiments of the present technology, the examples in which TransferJet is used as short-range wireless communication have been described, but other short-range wireless communication may be used. For example, WiGig (a high-rate wireless communication standard regulated by WiGig Alliance (Wireless Gigabit Alliance)) may be used.

Note that the aforementioned embodiments are shown as examples of embodying the present technology, and there is a correspondence between a matter in the embodiments and a matter specifying the present technology in the scope of claims. Likewise, there is a correspondence between a matter specifying the present technology in the scope of claims and a matter having the same name in the embodiments of the present technology. The present technology, however, is not limited to the embodiments, and can be embodied by making various modifications to the embodiments without departing from the gist of the technology.

Further, the procedures described in each of the aforementioned embodiments may be understood as a method including a series of these procedures, and may be understood as a program for causing a computer to execute the series of these procedures or a recording medium storing the program therein. As the recording medium, for example, a hard disk, a CD (a Compact Disc), an MD (a MiniDisc), a DVD (a Digital Versatile Disk), a memory card, or Blu-ray Disc (registered trademark) can be used.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing device including:

a communication unit that performs short-range wireless communication with another information processing device; and a control unit that performs control of supplying, via a memory, a display device with display information supplied from the other information processing device through the short-range wireless communication and causing the display device to display the display information, and supplying the display device with the display information supplied from the other information processing device and retained in the memory and causing the display device to display the display information, when a wireless communication quality of the short-range wireless communication with the other information processing device satisfies a predetermined condition.

(2) The information processing device according to (1), wherein the control unit performs control of supplying the display device with the display information supplied from the other information processing device and retained in the memory and causing the display device to display the display information immediately before the wireless communication quality comes into a state of satisfying the predetermined condition.

(3) The information processing device according to (1) or (2), wherein the control unit performs control of determining that the wireless communication quality satisfies the predetermined condition when the short-range wireless communication with the other information processing device is disconnected, and supplying the display device with the display information supplied from the other information processing device and retained in the memory and causing the display device to display the display information until the short-range wireless communication with the other information processing device is enabled.

(4) The information processing device according to (1) or (2), wherein the control unit performs control of determining that the wireless communication quality satisfies the predetermined condition when a reception signal intensity of the short-range wireless communication with the other information processing device is less than a threshold value as a reference, and supplying the display device with the display information supplied from the other information processing device and retained in the memory and causing the display device to display the display information until the reception signal intensity of the short-range wireless communication with the other information processing device is greater than the threshold value as the reference.

(5) The information processing device according to any one of (1) to (4), wherein the control unit performs control of causing the display device to display the display information supplied from the other information processing device and retained in the memory and a fact that the display information retained in the memory is displayed when the wireless communication quality satisfies the predetermined condition.

(6) An information processing device including:
  a communication unit that performs short-range wireless communication with another information processing device;
  a display unit that displays display information supplied from the other information processing device; and
  a control unit that performs control of supplying, via a memory, the display unit with the display information supplied from the other information processing device through the short-range wireless communication and causing the display unit to display the display information, and supplying the display unit with the display information supplied from the other information processing device and retained in the memory and causing the display unit to display the display information when a wireless communication quality of the short-range wireless communication with the other information processing device satisfies a predetermined condition.

(7) An information processing system including:
  a first information processing device that supplies display information using short-range wireless communication;
  a second information processing device that performs control of supplying, via a memory, a display device with the display information supplied from the first information processing device using the short-range wireless communication, and supplying the display device with the display information supplied from the first information processing device and retained in the memory when a wireless communication quality of the short-range wireless communication with the first information processing device satisfies a predetermined condition; and
  the display device that displays the display information supplied from the second information processing device.

(8) An information processing method including:
  supplying, via a memory, a display device with display information supplied from another information processing device through short-range wireless communication and causing the display device to display the display information; and
  supplying the display device with the display information supplied from the other information processing device and retained in the memory and causing the display device to display the display information when a wireless communication quality of the short-range wireless communication with the other information processing device satisfies a predetermined condition.

The present disclosure contains subject matter related to that disclosed in Japanese Priority Patent Application JP 2012-117755 filed in the Japan Patent Office on May 23, 2012, the entire content of which is hereby incorporated by reference.

What is claimed is:

1. An information processing device comprising:
  a communication unit that performs short-range wireless communication with another information processing device, the another information processing device being a mobile device; and
  a control unit that performs control of supplying, via a memory, a display device, which is connected to the information processing device, with display information that has been wirelessly supplied from the another information processing device and received through the short-range wireless communication, and performs control of initiating a displaying of the display information on the display device, and, when a wireless communication quality of the short-range wireless communication with the another information processing device satisfies a predetermined condition, the control unit initiates the supplying of the display device with the display information that has been wirelessly supplied from the another information processing device and retained in the memory and initiates the displaying of the display information on the display device,
  wherein the control unit performs, when the wireless communication quality satisfies the predetermined condition, the control of initiating the displaying, on the display device, of the display information that has been wirelessly supplied from the another information processing device and retained in the memory and of an indicator that indicates information regarding the wireless communication quality and that also indicates that the display information that has been initiated to be displayed on the display device is information that was retrieved from contents of the memory,
  wherein a displaying of real-time image content generated by an application executing on the another information processing device and provided for display on the display device is replaced, upon a satisfaction of the predetermined condition, by a displaying of the display information provided via the memory, the display information representing at least a portion of the real-time image content that was being displayed immediately prior to the satisfying of the predetermined condition, to therefore provide for a display of still image content upon the display device, and
  wherein the communication unit and the control unit are each implemented via at least one processor.

2. The information processing device according to claim 1, wherein the control unit performs control of supplying the display device with the display information that has been supplied from the another information processing device and retained in the memory and initiating the displaying of the display information on the display device such that the display information is displayed on the display device immediately before the wireless communication quality comes into a state of satisfying the predetermined condition.

3. The information processing device according to claim 1, wherein the control unit performs control of determining that the wireless communication quality satisfies the predetermined condition when the short-range wireless communication with the another information processing device is disconnected, and supplying the display device with the display information that has been supplied from the another information processing device and retained in the memory and initiating the displaying of the display information on the display device such that the display information is displayed on the display device until the short-range wireless communication with the another information processing device is enabled.

4. The information processing device according to claim 1, wherein the control unit performs control of determining that the wireless communication quality satisfies the predetermined condition when a reception signal intensity of the short-range wireless communication with the another information processing device is less than a threshold value as a reference, and supplying the display device with the display information that has been supplied from the another information processing device and retained in the memory and initiating the displaying of the display information on the display device such that the display information is displayed on the display device until the reception signal intensity of the short-range wireless communication with the another information processing device is greater than the threshold value as the reference.

5. An information processing device comprising:
a communication unit that performs short-range wireless communication with another information processing device, the another information processing device being a mobile device;
a display unit that displays display information supplied from the another information processing device; and
a control unit that performs control of supplying, via a memory, the display unit with the display information that has been wirelessly supplied from the another information processing device through the short-range wireless communication, and performs control of initiating a displaying of the display information on the display unit, and, when a wireless communication quality of the short-range wireless communication with the another information processing device satisfies a predetermined condition, the control unit initiates the supplying to the display unit of the display information that has been supplied from the another information processing device and retained in the memory and initiates the displaying of the display information on the display unit,
wherein the control unit performs, when the wireless communication quality satisfies the predetermined condition, the control of initiating the displaying, on the display device, of the display information that has been wirelessly supplied from the another information processing device and retained in the memory and of an indicator that indicates information regarding the wireless communication quality and that also indicates that the display information that has been initiated to be displayed on the display device is information that was retrieved from contents of the memory,
wherein a displaying of real-time image content generated by an application executing on the another information processing device and provided for display on the display unit is replaced, upon a satisfaction of the predetermined condition, by a displaying of the display information provided via the memory, the display information representing at least a portion of the real-time image content that was being displayed immediately prior to the satisfying of the predetermined condition, to therefore provide for a display of still image content upon the display unit, and
wherein the communication unit, the display unit, and the control unit are each implemented via at least one processor.

6. An information processing system comprising:
a first information processing device which is a mobile device that supplies display information using short-range wireless communication;
a second information processing device that performs control of supplying, via a memory, a display device with the display information that has been wirelessly supplied from the first information processing device using the short-range wireless communication, and, when a wireless communication quality of the short-range wireless communication with the first information processing device satisfies a predetermined condition, the second information processing device performs control of supplying the display device with the display information that has been supplied from the first information processing device and retained in the memory; and
the display device, which is connected to the second information processing device and that displays the display information supplied from the second information processing device,
wherein, when the wireless communication quality satisfies the predetermined condition, the display information that has been supplied from the first information processing device and retained in the memory is displayed and an indicator that indicates information regarding the wireless communication quality and that also indicates that the display information that has been initiated to be displayed on the display device is information that was retrieved from contents of the memory is also displayed, and
wherein a displaying of real-time image content generated by an application executing on the first information processing device and provided for display on the display device is replaced, upon a satisfaction of the predetermined condition, by a displaying of the display information provided via the memory, the display information representing at least a portion of the real-time image content that was being displayed immediately prior to the satisfying of the predetermined condition, to therefore provide for a display of still image content upon the display device.

7. An information processing method comprising:
supplying, via a memory, a connected display device with display information that has been supplied from another information processing device through short-range wireless communication, the another information processing device being a mobile device, and initiating a displaying of the display information on the connected display device; and
when a wireless communication quality of the short-range wireless communication with the another information processing device satisfies a predetermined condition, supplying the connected display device with the display information that has been supplied from the another information processing device and retained in the memory and initiating the displaying of the display information on the connected display device,
wherein, when the wireless communication quality satisfies the predetermined condition, the display information that has been supplied from the another information processing device and retained in the memory is displayed and an indicator that indicates information regarding the wireless communication quality and that also indicates the display information that has been initiated to be displayed on the connected display device is information that was retrieved from contents of the memory is also displayed, and
wherein a displaying of real-time image content generated by an application executing on the another information processing device and provided for display on the connected display device is replaced, upon a satisfaction of the predetermined condition, by a displaying of the display information provided via the memory, the display information representing at least a portion of the real-time image content that was being displayed immediately prior to the satisfying of the predetermined condition, to therefore provide for a display of still image content upon the connected display device.

* * * * *